US011858281B2

(12) United States Patent
Knipp et al.

(10) Patent No.: US 11,858,281 B2
(45) Date of Patent: Jan. 2, 2024

(54) PLASTIC CARD WITH ENHANCED DURABILITY COLORED MACHINED CHARACTERS

(71) Applicant: Entrust Corporation, Shakopee, MN (US)

(72) Inventors: Roman Knipp, Shakopee, MN (US); Utpal Vaidya, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 17/477,075

(22) Filed: Sep. 16, 2021

(65) Prior Publication Data

US 2022/0080743 A1 Mar. 17, 2022

Related U.S. Application Data

(60) Provisional application No. 63/079,832, filed on Sep. 17, 2020.

(51) Int. Cl.
*B41J 3/38* (2006.01)

(52) U.S. Cl.
CPC .................................... *B41J 3/387* (2013.01)

(58) Field of Classification Search
CPC ......... B41J 3/38; B41J 3/387; B41J 11/00214
See application file for complete search history.

(56) References Cited

U.S. PATENT DOCUMENTS

| | | | | |
|---|---|---|---|---|
| 4,825,054 | A | 4/1989 | Rust et al. | |
| 4,995,501 | A | 2/1991 | Lundstrom et al. | |
| 5,266,781 | A | 11/1993 | Warwick et al. | |
| 5,837,991 | A | 11/1998 | LaManna et al. | |
| 6,001,893 | A * | 12/1999 | Vaidya ..................... | C09D 4/06 522/182 |
| 6,131,817 | A | 10/2000 | Miller | |
| 6,245,382 | B1 * | 6/2001 | Shvartsman ........... | B42D 25/00 427/420 |
| 6,783,067 | B2 | 8/2004 | Kreuter et al. | |
| 6,902,107 | B2 | 6/2005 | Shay et al. | |
| 7,398,972 | B2 | 7/2008 | Schuller et al. | |
| 7,434,728 | B2 | 10/2008 | Paulson et al. | |
| 7,770,801 | B1 | 8/2010 | Bailey et al. | |
| 7,866,904 | B2 | 1/2011 | Bungert et al. | |
| 10,625,464 | B2 | 4/2020 | Juriasingani et al. | |
| 2005/0268805 | A1 | 12/2005 | Kubert et al. | |
| 2007/0187870 | A1 | 8/2007 | Lundstrom et al. | |
| 2009/0315321 | A1 | 12/2009 | Michieli et al. | |

(Continued)

OTHER PUBLICATIONS

International Search Report and Written Opinion, International Patent Application No. PCT/IB2021/058472, dated Dec. 21, 2021 (7 pages).

*Primary Examiner* — Christopher E Mahoney
*Assistant Examiner* — Marissa Ferguson-Samreth
(74) *Attorney, Agent, or Firm* — Hamre, Schumann, Mueller & Larson, P.C.

(57) ABSTRACT

A material that is curable by radiation is applied over or included in colored material on non-printed machined characters formed on a plastic card. After applying the colored material and the radiation curable material to the machined characters, radiation is used to cure the radiation curable material. The colored material has improved durability due to the radiation cured material.

19 Claims, 9 Drawing Sheets

(56) References Cited

U.S. PATENT DOCUMENTS

| | | | | |
|---|---|---|---|---|
| 2017/0228632 | A1* | 8/2017 | Knipp .................... | G06K 19/18 |
| 2019/0344565 | A1 | 11/2019 | Bontrager et al. | |
| 2020/0184303 | A1 | 6/2020 | Herslow et al. | |
| 2020/0207011 | A1 | 7/2020 | Juriasingani et al. | |

* cited by examiner

Fig. 10
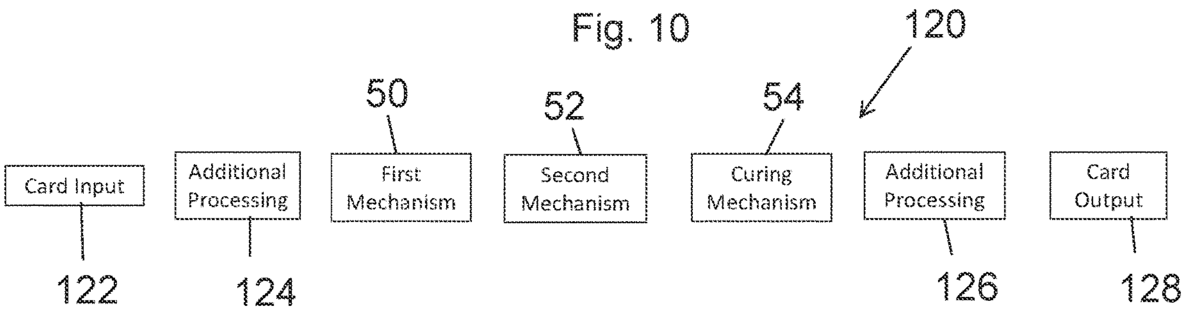
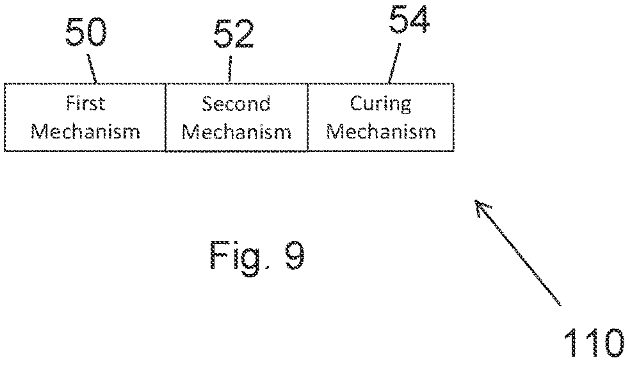
Fig. 9

PLASTIC CARD WITH ENHANCED DURABILITY COLORED MACHINED CHARACTERS

FIELD

This disclosure relates to plastic cards including, but not limited to, financial (e.g., credit, debit, or the like) cards, access cards, driver's licenses, national identification cards, business identification cards, gift cards, and other plastic cards that include characters that are formed by deforming the substrate material.

BACKGROUND

The use of embossed and indented characters on plastic cards is common. To improve the appearance and visibility of the characters, a colored ink may be applied to the characters prior to the plastic card being issued to the intended cardholder.

SUMMARY

Systems and methods are described for improving the durability of color material applied to non-printed, machined characters. A material that is curable by radiation, such as ultraviolet (UV) radiation, is applied over or incorporated into the color material applied to the characters. After applying the color material and the radiation curable material to the characters, radiation is used to cure the radiation curable material.

At least the radiation curable material, and optionally the color material, is applied to the machined characters after the machined characters are formed on the card. In one embodiment, the color material and the radiation curable material (and optionally an adhesive) can be applied from a topping foil in a single transfer step using heat and pressure. In one embodiment, the color material and the radiation curable material (and the optional adhesive) can be separate layers. In another embodiment, the color material and the radiation curable material (and the optional adhesive) that is applied to the machined characters can be blended together or blended in other combinations (for example, color ink with adhesive with a separate radiation curable layer) and applied as a composition to the characters, for example using drop-on-demand printing.

A non-printed machined character refers to a character that is formed in a substrate material of the plastic card by permanently deforming the substrate material in some manner. Examples of non-printed machined characters include, but are not limited to, characters formed by embossing or indenting, characters formed by removing some of the substrate material with a laser (e.g. laser etching), characters formed by causing the substrate material to bubble or raise up using a laser. Embossed characters and indented characters may also be referred to as stamped characters since in embossing and indenting, a die stamp that is brought into engagement with the substrate material and pressure, optionally together with heat, is used to deform the substrate material to create the embossed or indented characters. A non-printed machined character excludes printed characters formed by printing processes such as thermal transfer, drop-on-demand printing, or the like.

In the case of embossed characters and other characters that are raised above the surrounding surface of the plastic card, the radiation curable material can be applied to the tips of the raised characters. In the case of indented or etched characters (i.e. recessed characters), the radiation curable material can be applied so that the radiation curable material resides at least partially within the recessed characters.

The color material can be any material that provides a desired color to the characters. Examples of the color material include, but are not limited to, a colored ink or a colored metal.

The plastic cards described herein can be any type of plastic card that is issued to a card holder and that includes non-printed, machined characters. The plastic card may include personal data that is personal to the intended card holder, including a personal account number, the card holder's name, a photograph of the intended card holder, an address, an expiration date, and other personal data known in the art. The plastic card may also include non-personal data such as a name and/or logo of the card issuer and graphical elements. Examples of plastic cards include, but are not limited to, financial (e.g., credit, debit, or the like) cards, access cards, driver's licenses, national identification cards, business identification cards, gift cards, and other plastic cards.

The non-printed, machined characters described herein can form some or all of a personal account number, the card holder's name, an address, an expiration date, and other personal data. The non-printed, machined characters may also form some or all of non-personal data.

In one embodiment, a plastic card personalization system described herein can include a first mechanism that is configured to form non-printed machined characters on a plastic card by deforming a substrate material of the plastic card. A second mechanism is positioned relative to the first mechanism to receive the plastic card with the non-printed machined characters, and the second mechanism is configured to apply radiation curable material to the non-printed machined characters. A curing mechanism is positioned relative to the second mechanism to receive the plastic card with the radiation curable material applied to the non-printed machined characters, and the curing mechanism is configured to generate and apply radiation to the non-printed machined characters to cure the radiation curable material.

In another embodiment, a method of personalizing a plastic card can include forming non-printed machined characters on the plastic card in a first mechanism by deforming a substrate material of the plastic card. Thereafter, the plastic card is transported to a second mechanism and radiation curable material is applied to the non-printed machined characters in the second mechanism. Thereafter, the plastic card is transported to a curing mechanism and the radiation curable material that is applied to the non-printed machined characters is cured in the curing mechanism.

The first mechanism can be an embossing mechanism, an indenting mechanism, a laser, or any other mechanism for forming a non-printed machined character. The second mechanism can be configured to also apply an ink to the characters. The second mechanism can be configured to apply the radiation curable material using a foil or using drop-on-demand printing. In the case of a foil, the foil can include a carrier layer, a layer of the radiation curable material, and a layer of ink, wherein the layer of the radiation curable material is disposed between the carrier layer and the layer of ink. The second mechanism can include at least one drop-on-demand print head. In one embodiment, the second mechanism can include a plurality of drop-on-demand print heads In another embodiment, a plastic card personalization system can include an embossing mechanism configured to form embossed characters on a plastic card. An application mechanism is positioned to receive the plastic card after the plastic card is embossed in the embossing mechanism, and the application mechanism is configured to apply radiation curable material to tips of the embossed characters. A curing mechanism is positioned to receive the plastic card after the application mechanism applies the radiation curable material, and the curing mechanism is configured to generate and apply radiation to the embossed characters to cure the radiation curable material.

In another embodiment, a plastic card personalization system can include an indenting mechanism configured to form indented characters on a plastic card. An application mechanism is positioned to receive the plastic card after the indented characters are formed in the indenting mechanism, and the application mechanism is configured to apply radiation curable material to the indented characters. A curing mechanism is positioned to receive the plastic card after the mechanism applies the radiation curable material, and the curing mechanism is configured to generate and apply radiation to the indented characters to cure the radiation curable material In another embodiment, a plastic card described herein can include a plastic card body, and a plurality of embossed characters formed in the plastic card body, with each embossed character having a tip. A color material and a radiation-cured transparent layer are on the tip of each one of the embossed characters, and for each tip the color material is disposed between the tip and the radiation-cured transparent layer.

DRAWINGS

FIG. 1 illustrates an example of a plastic card described herein.

FIG. 2 schematically depicts a plastic card personalization method described herein.

FIG. 3 schematically depicts a plastic card personalization system described herein.

FIG. 9 illustrates an example of a plastic card processing system that can implement the techniques described herein.

FIG. 10 illustrates another example of a plastic card processing system that can implement the techniques described herein.

DETAILED DESCRIPTION

Figure 1:
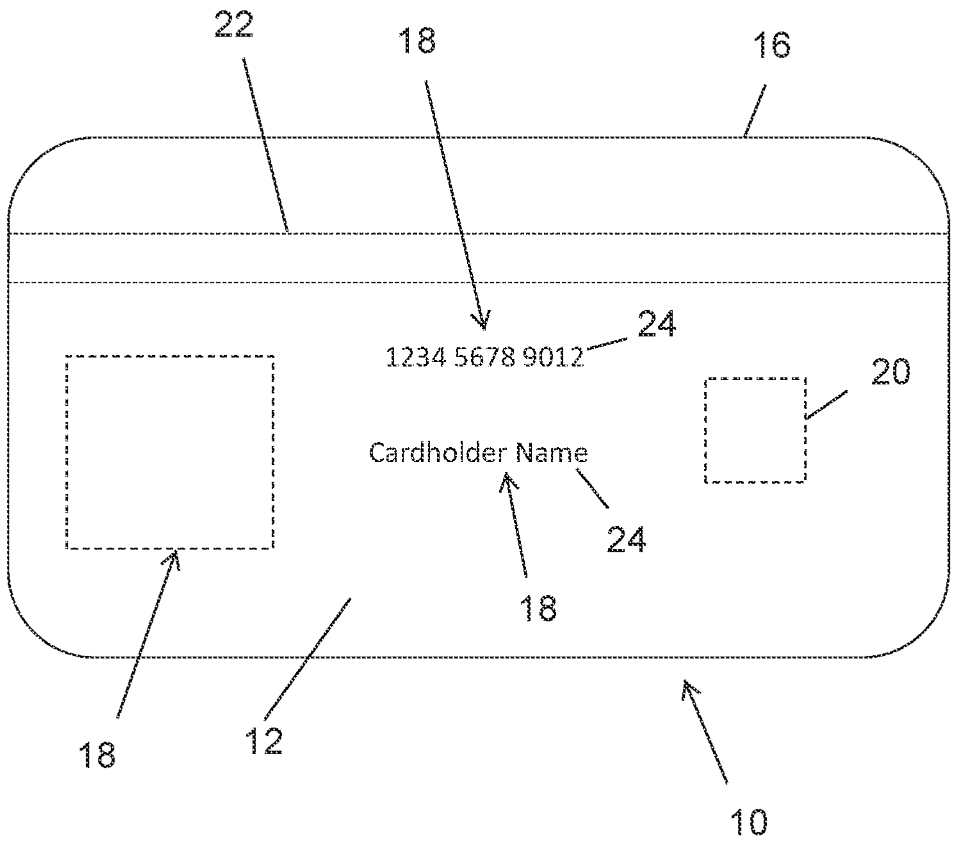

The following is a description of systems and methods for improving the durability of color material applied to non-printed machined characters on plastic cards. A material that is curable by radiation, such as UV radiation, is applied to the non-printed machined characters. The radiation curable material can be applied over the color material or mixed into the color material. Thereafter, the radiation curable material is cured by applying radiation, such as UV radiation.

Non-printed machined characters (or just machined characters) refers to characters that are formed in a substrate material (the card body or card substrate) of the plastic card by permanently deforming the substrate material in some manner. Examples of non-printed machined characters include, but are not limited to, characters formed by embossing or indenting, characters formed by removing the substrate material with a laser (e.g. laser etching) or chemically, or characters formed by causing the substrate material to bubble or raise up using a laser or chemical reaction. Embossing, indenting, etching and bubbling a plastic card are known in the art of plastic card processing.

The machined characters can be alphabetic characters, numerals, symbols, and combinations thereof. The machined characters can also have a design form including, but not limited to, emblems, seals, logos, and others.

Embossed characters described herein are characters that are indented from one side of the plastic card and raised above the surface at the opposite side of the card. Embossed characters and bubbled characters may be collectively referred to as raised characters since they are raised above the surrounding card surface. Indented characters and etched characters may be collectively referred to as recessed characters since they are recessed below the surrounding card surface in one card surface and are not raised above the opposite card surface. Embossed characters and indented characters may also be collectively referred to as stamped characters since in embossing and indenting, a die stamp that is brought into engagement with the substrate material and pressure, optionally together with heat, is used to deform the substrate material to create the embossed or indented characters. A non-printed machined character excludes printed characters formed by printing processes such as thermal transfer printing, drop-on-demand printing, or the like.

The plastic card can be any type of plastic card that is issued to a card holder and that includes machined characters. Examples of plastic cards include, but are not limited to, financial (e.g., credit, debit, or the like) cards, access cards, driver's licenses, national identification cards, business identification cards, gift cards, and other plastic cards. The term "plastic cards" as used throughout the specification and claims, unless indicated otherwise, refers to cards of this type where the card substrate can be formed entirely of plastic, formed of a combination of plastic and non-plastic material, or formed mostly or completely of non-plastic materials. In one embodiment, the cards can be sized to comply with ISO/IEC 7810 with dimensions of about 85.60 by about 53.98 millimeters (about 3⅜ in×about 2⅛ in) and rounded corners with a radius of about 2.88-3.48 mm (about ⅛ in).

The plastic card may include personal data that is personal to the intended card holder, including a personal account number, the card holder's name, a photograph of the intended card holder, an address, an expiration date, and other personal data known in the art. The plastic card may also include non-personal data such as a name and/or logo of the card issuer and graphical elements. The machined characters described herein can form some or all of a personal account number, a card verification value (CVV) number, the card holder's name, an address, an expiration date, and other personal data. The machined characters may also form some or all of non-personal data.

FIG. 1 illustrates an example of a plastic card 10. In this example, the card 10 is shown to include a front surface 12, a rear or back surface 14 (best seen in FIG. 5A) opposite the front surface 12, and a perimeter edge 16. The card 10 includes personal data 18, an optional integrated circuit chip 20, and an optional magnetic stripe 22.

With continued reference to FIG. 1, the personal data 18 in this example can be a photograph of the intended card holder, a personal account number, a CVV number, and the name of the cardholder. Some of the personal data 18, such as portions of or the entirety of the personal account number, CVV number, and/or the cardholder name, can be formed by machined characters 24 that are formed on the card 10. Some of the personal data 18 may be printed onto the card 10 using known printing techniques, for example direct to card thermal printing, drop-on-demand printing, retransfer printing, laser marking, and other printing techniques known in the art of plastic card processing.

For sake of convenience, the machined characters 24 will be described and illustrated in FIG. 1 as forming the personal account number of the intended card holder. The machined characters 24 can be formed to be visible from the front surface 12 as depicted in FIG. 1. Alternatively, the machined characters 24 can be formed to be visible from the rear surface 14.

Figure 2:
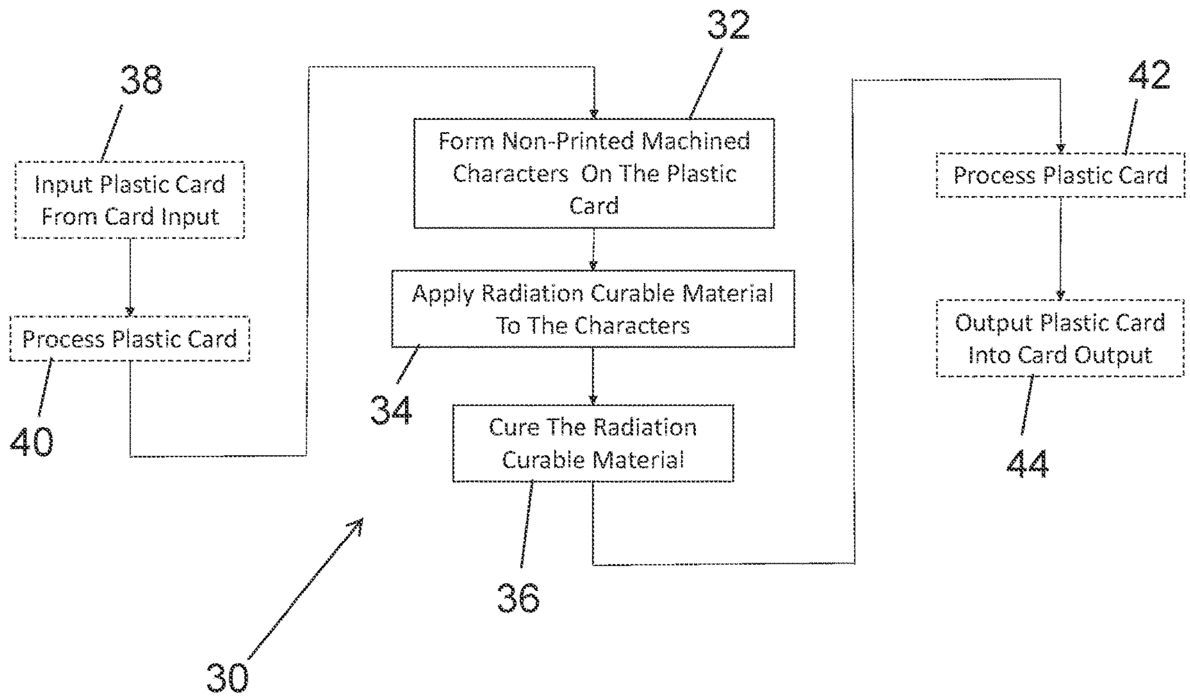

Referring to FIG. 2, a method 30 of personalizing a plastic card as described herein is illustrated. The method 30 includes forming the machined characters on the plastic card in step 32. Thereafter, in step 34, radiation curable material, such as UV curable colored ink and/or a UV curable varnish applied over a previously applied color material or applied together with a layer of color material, is applied to at least one of the machined characters. Thereafter, in step 36, the radiation curable material is cured, for example in a curing mechanism. Additional optional steps that can occur prior to forming the machined characters can include a step 38 of inputting the card from a card input and in one or more steps 40 performing additional processing on the card. Additional optional steps that can occur after curing the radiation curable material can include in one or more steps 42 performing additional processing on the card, followed by a step 44 of outputting the card into a card output.

Figure 3:
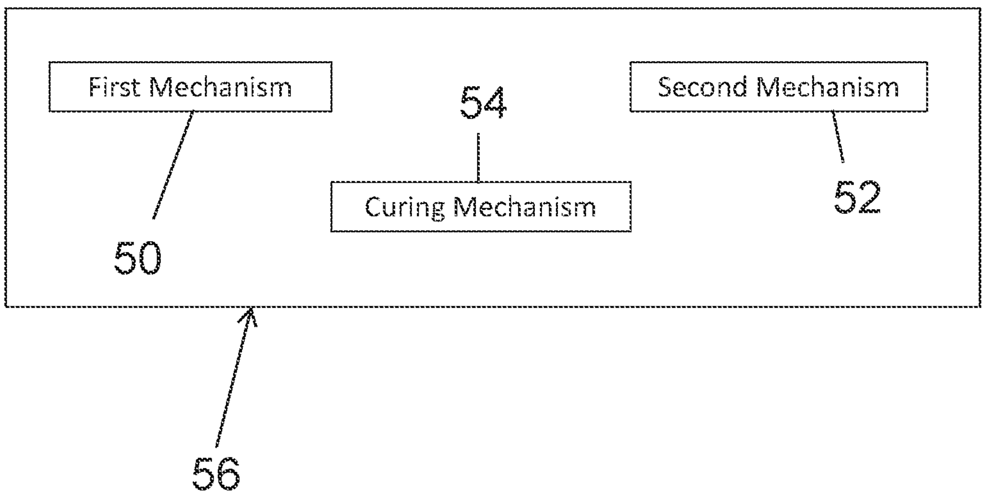

Referring to FIG. 3, the formation of the machined characters is preferably achieved using a first mechanism 50. The application of the radiation curable material to the machined characters is preferably achieved using a second mechanism 52. The curing of the radiation curable material is achieved using a curing mechanism 54. The mechanisms 50, 52, 54 are preferably incorporated together into a plastic card personalization system 56. The system 56 can be configured as a desktop card system that is typically designed for relatively smaller scale, individual card personalization in relatively small volumes, for example measured in tens or low hundreds of cards per hour, often times with a single card being processed at any one time. These card personalization machines are often termed desktop personalization machines because they have a relatively small footprint intended to permit the machine to reside on a desktop. Many examples of desktop personalization machines are known, such as the SD or CD family of desktop card printers available from Entrust Corporation of Shakopee, Minnesota Other examples of desktop personalization machines are disclosed in U.S. Pat. Nos. 7,434,728 and 7,398,972, each of which is incorporated herein by reference in its entirety. The system 56 can also be configured as a large volume batch production card personalization system (or central issuance personalization system) that processes cards in high volumes, for example on the order of high hundreds or thousands of cards per hour, and that employs multiple processing stations or modules to process multiple cards at the same time to reduce the overall per card processing time. Examples of such large volume card personalization machines include the MX and MPR family of central issuance personalization machines available from Entrust Corporation of Shakopee, Minnesota Other examples of central issuance personalization machines are disclosed in U.S. Pat. Nos. 4,825,054, 5,266,781, 6,783,067, and 6,902,107, all of which are incorporated herein by reference in their entirety.

The first mechanism 50 can be any mechanism that is suitable for forming machined characters described herein. For example, the first mechanism 50 can be an embossing mechanism, an indenting mechanism, or a laser mechanism each of which are well known in the art of plastic card processing. Embossing mechanisms, indenting mechanisms, and laser mechanisms are available from Entrust Corporation of Shakopee, Minnesota.

The second mechanism 52 is positioned relative to the first mechanism 50 to receive the plastic card from the first mechanism 50 after the machined characters are formed. The second mechanism 52 (which may also be referred to an as application mechanism) is configured to apply the radiation curable material to the machined characters. The radiation curable material can be applied over or incorporated into a color material that is applied to the machined characters. The color material and the radiation curable material (and an optional adhesive) can be applied from a topping foil in a single transfer step using heat and pressure or applied using one or more drop-on-demand print heads. In one embodiment, the color material and the radiation curable material (and the optional adhesive) can be separate layers. In another embodiment, the color material and the radiation curable material (and the optional adhesive) that is applied to the machined characters can be blended together or blended in other combinations (for example, color ink with adhesive with a separate radiation curable layer) and applied as a composition to the machined characters, for example using drop-on-demand printing.

When the radiation curable material is in liquid or gel form, radiation curable material can be applied to the machined characters by a number of methods including, but not limited to, spraying, drop on demand printing, a pad, a roller, cylinders, anilox, and others.

Figure 4A:
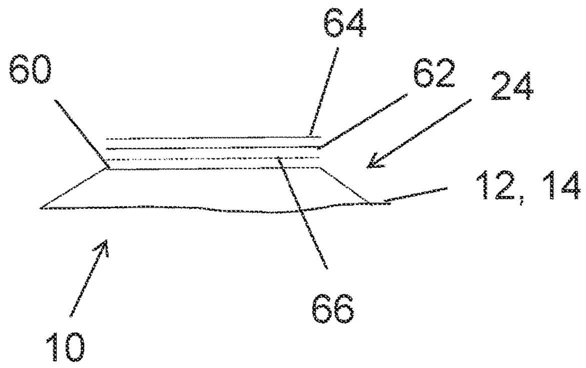
FIG. 4A is a close up view of a raised non-printed machined character described herein.

FIG. 4A illustrates an example of one of the machined characters 24 described herein in the form of a raised character raised on the surface 12, 14 of the card 10. In one embodiment, the raised character 24 can be an embossed character. In the example illustrated in FIG. 4A, each machined character 24 can include a tip 60. The tip 60 can be flat, upwardly or convexly rounded or curved, or have other shapes. In the example illustrated in FIG. 4A, a colored material layer 62 and a radiation-cured transparent or translucent layer 64 are disposed on the tip 60 of each machined character 24. The colored material layer 62 is disposed between the layer 64 and the surface of the tip 60. In some embodiments, an adhesive layer 66 can be disposed between the colored material layer 62 and the surface of the tip 60.

Figure 4B:
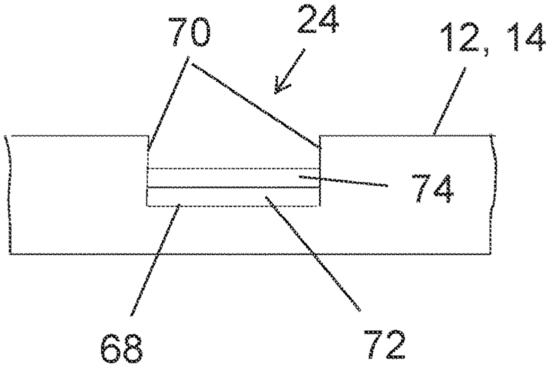
FIG. 4B is a close up view of a recessed non-printed machined character described herein.

FIG. 4B illustrates another example of one of the machined characters 24 described herein in the form of a recessed character, for example an indented character, that is recessed into the surface 12, 14 of the card 10. In the example illustrated in FIG. 4B, each machined character 24 can include a bottom surface 68 and upwardly extending side walls 70. The cross-section of the recessed character is depicted as being generally rectangular. However, the recessed character can have other cross-sectional shapes such as U-shaped, V-shaped, and other shapes. In the example illustrated in FIG. 4B, a colored material layer 72 is disposed in the recess and a radiation-cured transparent or translucent layer 74 is disposed over the layer 72. In some embodiments, an adhesive layer (not shown) similar to the adhesive layer 66 in FIG. 4A, can be disposed between the colored material layer 72 and the bottom surface 68. The colored material layer 72 can cover a portion of the bottom surface 68 or the entire bottom surface 68. In addition, the colored material layer 72 and the translucent layer 74 may fill only a portion of the depth of the recessed character, in which case the recessed character may be tactile, or the colored material layer 72 and the translucent layer 74 may fill the entire depth of the recessed character.

Instead of separate layers 62, 64, 66, 72, 74 in FIGS. 4A and 4B, the layers 62, 64, 66, 72, 74 may be blended or mixed together in any combinations. For example, the colored material and the radiation curable material may be mixed together and simultaneously applied; the colored material and the adhesive may be mixed together and simultaneously applied, followed by application of the radiation curable material. Other combinations are possible.

The colored material can be formed by any material that provides the desired color to the machined characters 24. Examples of the colored material include, but are not limited to, a colored ink or a colored metal. Examples of colors include, but are not limited to, black, white, metallic silver, metallic gold, and the like, each of which is known in the art. When the colored ink is formed by a metallic ink such as metallic silver or metallic gold, the adhesive layer 66 in FIG. 4A may be useful to help adhere the metallic ink to the card material.

The radiation curable material, such as the layer 64 in FIG. 4A or the layer 74 in FIG. 4B, is a layer of transparent or translucent material that is initially applied to the machined characters 24 in an uncured form and then cured after being applied via radiation applied to the uncured material. Examples of the radiation curable material that can be used include, but are not limited to, UV curable varnish, UV curable topcoat such as CardGard™, UV curable acrylates, UV curable urethanes, and UV curable clear overlay, each of which is available from Entrust Corporation of Shakopee, Minnesota. In one embodiment described further below, the colored ink layer and the uncured radiation curable material (and the adhesive layer if used), are applied together in a single transfer step from a topping foil in a hot stamping process. Once cured, the radiation-cured layer protects the underlying ink layer thereby enhancing the durability of the ink layer. In another embodiment, the colored ink and the radiation curable material can be blended together into a mixture, with the mixture then applied to the machined characters 24, and the radiation curable material is then cured.

Examples of colored ink that can be used to color the machined characters herein are the color inks in ink jet cartridges, and the Cyan, Magenta, Yellow, Black and White drop-on-demand ink cartridges available from Entrust Corporation of Shakopee, Minnesota. In addition, an example of a clear varnish that can be used as the radiation curable material is the clear varnish drop-on-demand cartridge available from Entrust Corporation of Shakopee, Minnesota.

Returning to FIG. 1, the integrated circuit chip 20 is known in the art and can include data storage for storing data thereon. The data stored on the chip 20 can include personal data of the intended card holder such as the cardholder's name, personal account number, the CVV number, biometric data of the cardholder, and other data. The chip 20 can be a contactless chip that is powered by a contactless chip reader through radio frequency induction via an antenna of the chip reader. The chip 20 may also be a contact chip that is intended for direct contact with a contact chip reader which provides power to the chip 20. The chip 20 may be completely embedded within the thickness of the card so that no portion of the chip 20 is exposed, or portions of the chip 20 may be exposed. The construction and operation of both contactless chips and contact chips on cards is well known in the art.

The magnetic stripe 22 has a construction and operation that is well known in the art. In the example illustrated in FIG. 1, the magnetic stripe 22 is depicted as being located on the rear surface 14 of the card 10. However, the magnetic stripe 22 (if present) can be located on the front surface 12. The magnetic stripe 22 can store various data thereon including, but not limited to, data of the intended card holder such as the cardholder's name, the CVV number, personal account number, biometric data of the cardholder, and other data.

Figure 5A:
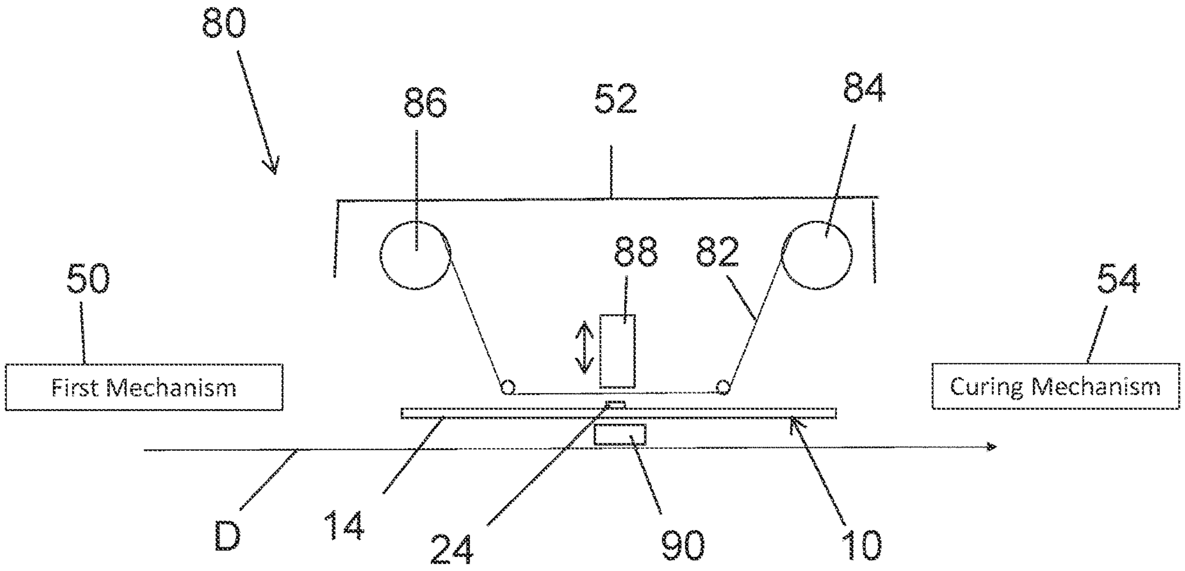
FIG. 5A illustrates components of a plastic card personalization system, including an application/second mechanism, that can apply radiation curable to the non-printed machined characters described herein.

Referring to FIG. 5A, an embodiment of a plastic card personalization system 80 that incorporates the mechanisms 50, 52, 54 is illustrated. The system 80 includes the first mechanism 50 which in this embodiment is illustrated as creating a machined character 24 in the form of a raised character on the plastic card 10. However, in other embodiments, the first mechanism 50 can be configured to form indented or other recessed characters. A card transport direction of the card 10 through the system 80 is illustrated by the arrow D. The system 80 can optionally include additional card processing mechanisms. The 50, 52, 54 can be separate mechanisms or modules, or the functions of the mechanisms 50, 52, 54 can be integrated together into a single mechanism.

In FIG. 5A, the second mechanism 52 is configured as a topping mechanism that is configured to apply radiation curable material as well as colorant material to the tips of the machined characters 24. The first mechanism 50 is configured to receive the card 10 and create one or more of the machined characters 24 on the card 10. The construction and operation of mechanisms, such as embossers and lasers, for creating raised, machined characters on cards is well known in the art. An example of an embosser that can be used is the embossing mechanism described in US 2007/0187870 the entire contents of which are incorporated herein by reference. Additional examples of embossers that can be used are the embossing mechanisms used in the MX and MPR family of central issuance processing machines available from Entrust Corporation of Shakopee, Minnesota.

The second mechanism 52 receives the card 10 after the card 10 is formed with the machined characters in the first mechanism 50, and the second mechanism 52 is configured to apply the colored material layer to color the tips of the machined characters and also apply the radiation curable material layer. In this example, the second mechanism 52 includes a foil 82, a supply spool 84 that supplies the foil 82, and a take-up spool 86 that takes-up used foil 82. The foil 82 is directed past a transfer station that includes a heated stamp or die 88 that is actuatable toward and away from the card 10 to press the foil 82 into engagement with the tips of the machined characters to transfer the colorant, for example a colored ink or colored metal, and the radiation curable material to the tips, and a fixed platen 90 disposed opposite the stamp 88 to support the card during hot stamping by the stamp 88.

Figure 6:
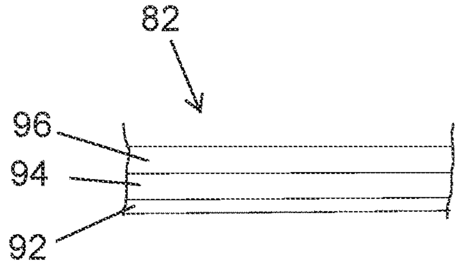
FIG. 6 illustrates a first example of a foil that can be used in the application mechanism described herein.

The foil 82 is configured to transfer the colored material layer and the radiation-curable layer (and optionally the adhesive layer) to the tips of the machined characters (or into the recessed machined characters) in a single transfer step at the transfer station. FIG. 6 illustrates a first embodiment of the foil 82. In this embodiment, the foil 82 includes a carrier layer 92, a layer 94 of radiation curable material disposed on the carrier layer 92, and a layer 96 of colored ink disposed over the layer 94. In operation, a portion of the ink from the layer 96 and a portion of the radiation curable material from the layer 94 are simultaneously transferrable from the carrier layer 92 to the tips of the machined characters (or into the recessed machined characters) in the transfer station to form the colored material layer and the uncured radiation curable layer. In another embodiment, the material of the layers 94, 96 are combined together into a mixture so that the foil 82 has a single layer on the carrier layer 92 which combines both coloring material and radiation curable material to form a radiation curable colored ink, with material from the single layer then being transferred from the foil to the machined characters and thereafter the material is cured.

In one non-limiting embodiment, the first mechanism 50 is configured to form embossed characters, the second mechanism is configured to apply color material and/or radiation curable material to the tips of the embossed characters from the foil 82, followed thereafter by curing the radiation curable material in the curing mechanism 54.

Figure 7:
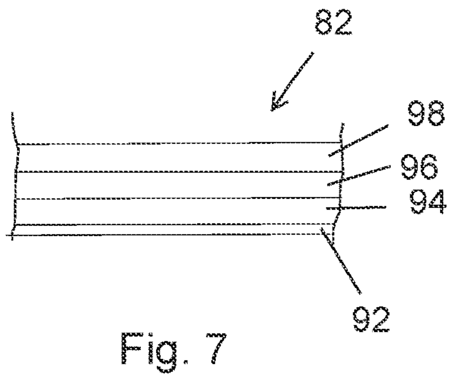
FIG. 7 illustrates a second example of a foil that can be used in the application mechanism described herein.

FIG. 7 illustrates a second embodiment of the foil 82. In this embodiment, the foil 82 includes the carrier layer 92, the layer 94 of radiation curable material disposed on the carrier layer 60, the layer 96 of colored material disposed over the layer 94, and a layer 98 of adhesive material that helps to adhere the colored material to the machined characters. In operation of this embodiment, a portion of the adhesive from the layer 98, a portion of the colored material from the layer 96, and a portion of the radiation curable material from the layer 94 are simultaneously transferrable from the carrier layer 92 to the machined characters in the transfer station. In another embodiment, the material of the layers 94. 96 are combined together into a mixture so that the foil 82 has a layer on the carrier layer 92 which combines both coloring material and radiation curable material to form a radiation curable colored ink together with the adhesive layer 98. In still another embodiment, the material of the layers 94, 96, 98 are combined together into a mixture so that the foil 82 has a single layer on the carrier layer 92 which combines both coloring material, radiation curable material and adhesive to form a radiation curable colored ink.

Returning to FIG. 5A, after the material is applied to the machined characters, the card 10 is transported to the curing mechanism 54 to cure the radiation curable material. The curing mechanism 54 is configured to generate and apply radiation, such as UV radiation, to the radiation curable material to cure the radiation curable material. An example of a mechanism that can generate and apply curing radiation in a card personalization system is the radiation applicator used in the DATACARD® MX8100™ Card Issuance System available from Entrust Corporation of Shakopee, Minnesota.

Figure 5B:
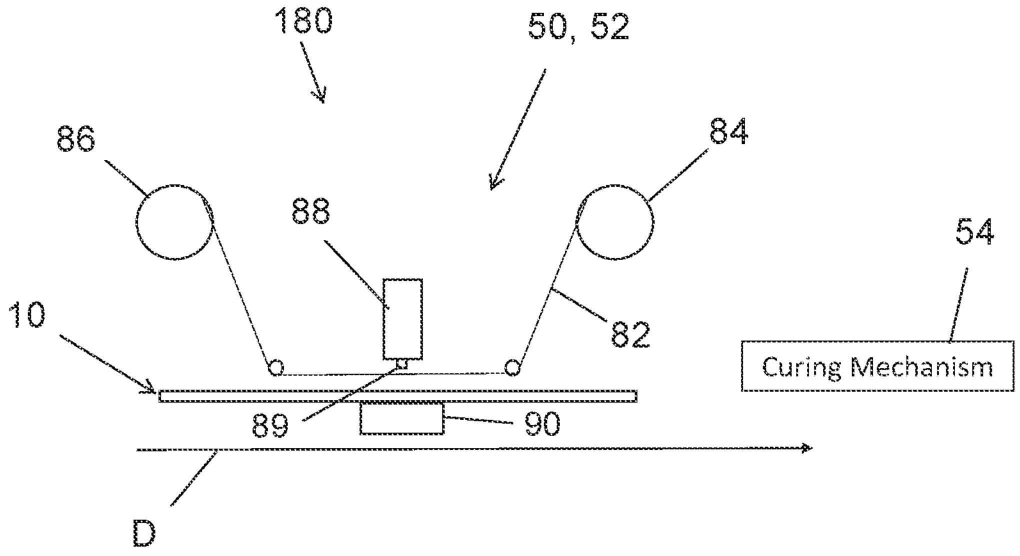
FIG. 5B illustrates an example of a plastic card personalization system in the form of an indenting mechanism that can form the non-printed machined characters in the form of indented characters and at the same time apply radiation curable material to the indented characters.

Referring to FIG. 5B, another embodiment of a plastic card personalization system 180 is illustrated. In the system 180, elements that are the same as or similar to the elements in FIG. 5A are referenced using the same reference numerals. The system 180 is depicted as being configured to create indented characters on the card 10 and at the same time apply coloring material and radiation curable material (and optionally adhesive) to the indented characters at the same time the indented characters are formed. So in the system 180 the first mechanism 50 and the second mechanism 52 are combined into a common mechanism.

In FIG. 5B, the combined mechanism 50, 52 is configured as an indenting mechanism that creates machined characters in the form of indented characters and that uses one of the ribbons 82 in FIGS. 6 and 7. The construction and operation of indenting mechanisms, for creating indented, machined characters on cards is well known in the art. An example of an indenter that can be used is the indenting mechanism described in U.S. Pat. No. 10,625,464 the entire contents of which are incorporated herein by reference. Additional examples of indenters that can be used are available from Entrust Corporation of Shakopee, Minnesota.

In this example, the combined mechanism 50, 52 includes the foil 82, the supply spool 84 that supplies the foil 82, and the take-up spool 86 that takes-up used foil 82. The foil 82 is directed past a transfer station that includes a heated stamp or die 88 that is actuatable toward and away from the card 10. The die 88 includes one or more projecting, heated characters 89 press into the card 10 to create the indented character. At the same time, the foil 82 is pressed into the indented character that is being formed to simultaneously transfer the colorant, for example a colored ink or colored metal, and the radiation curable material (or the mixture thereof) into the indented character created by the character (s) 89. The fixed platen 90 is disposed opposite the stamp 88 to support the card during creation of the indented character (s) by the character(s) 89. The card 10 is then transported to the curing mechanism 54 to cure the radiation curable material.

Figure 8:
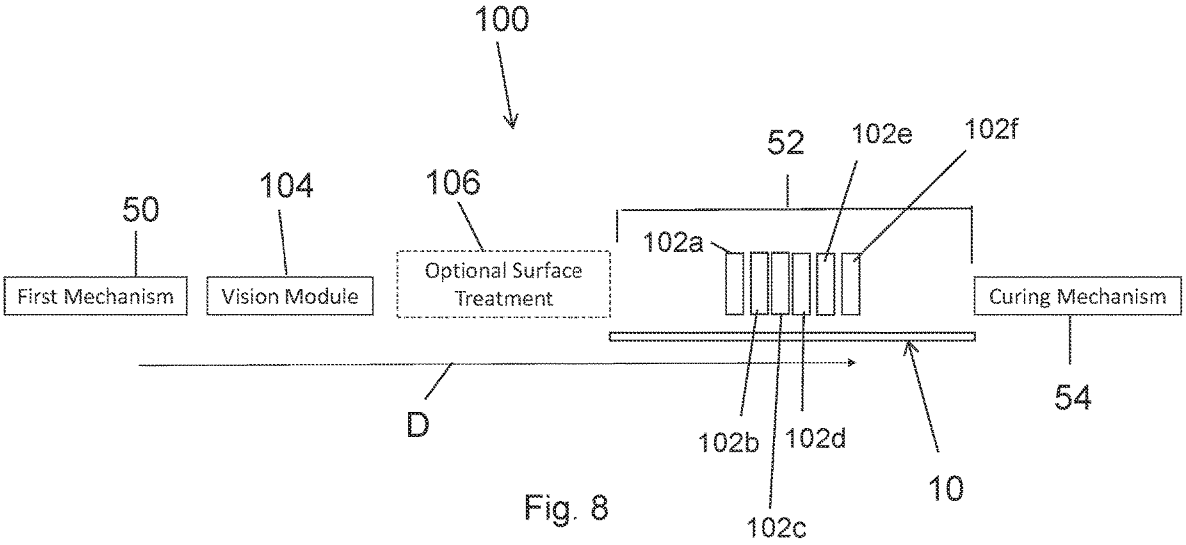
FIG. 8 illustrates an example of the application/second mechanism that utilizes drop-on-demand printing.

With reference to FIG. 8, in another embodiment, the application of the colored material and/or the application of the UV curable material to the machined characters in the second mechanism 52 can be performed using drop-on-demand printing technology. In FIG. 8, elements that are or can be the same as in FIGS. 1-7 are referenced using the same reference numerals. In FIG. 8, a plastic card personalization system 100 includes the first mechanism 50, the second mechanism 52 which in this embodiment functions by drop-on-demand printing using one or more drop-on-demand print heads 102*a-f*, and the curing mechanism 54. The card transport direction of the card 10 through the system 100 is illustrated by the arrow D. The system 100 can also optionally include a vision module 104, and a surface treatment mechanism 106. The vision module 104 and the surface treatment mechanism 106 may be considered part of the second mechanism 52 or separate from the second mechanism 52. The first mechanism 50, the vision module 104, the surface treatment mechanism 106, the second mechanism 52 and the curing mechanism 54 can be separate mechanisms or modules, or the functions thereof can be integrated together into a single mechanism.

In operation of the system in FIG. 8, the machined characters 24 are formed on the card 10 in the first mechanism 50. Thereafter, the card 10 can be transported to the vision module 104 (if present) to capture an image of the machined characters 24 on the card 10 to ascertain details of the machined characters and where the machined characters are located on the card. Thereafter, the card can be transported to the second mechanism 52 which performs drop-on-demand printing using one or more of the drop-on-demand print heads 102*a-f* to apply colored ink or other colored material, radiation curable material (such as radiation curable colored ink or other radiation curable colored material) or radiation curable varnish (which is clear or translucent or semi-clear), and/or a mixture of colored ink and radiation curable material or radiation curable varnish on the machined characters 24.

In some embodiments, for example if radiation curable varnish is applied over a previously applied radiation curable colored ink or other radiation curable colored material, an additional curing mechanism, sometimes called a pinning lamp, can be provided, for example immediately after the individual print head 102*a-f* that applies the radiation curable colored ink or other colored material, to partially cure the colored ink/colored material before applying the radiation curable varnish. In this case, the radiation curable colored ink/colored material can be applied in a first drop-on-demand print head, which is followed by the additional curing mechanism, which in turn is followed by a second drop-on-demand print head that applies the radiation curable varnish.

The print heads 102*a-f* can also perform other drop-on-demand printing on portions of the card surface other than the machined characters as well. As illustrated in FIG. 8, separate print heads 102*a-f* can be provided to print different colors and/or different materials on the machined characters. However, in some embodiments, the second mechanism 52 can include a single drop-on-demand print head, or any other number of drop-on-demand print heads. Thereafter, the card is transported to the curing mechanism 54 to cure the radiation curable material. In some embodiments, the surface treatment mechanism 106 can be provided to apply surface treatments, such as plasma or corona treatment, to the machined characters (as well as to other portions of the card surface) before printing with radiation curable inks.

The use of drop-on-demand printing techniques permits application of any color on the machined characters 24. In addition, radiation cured inks are inherently more durable than uncured inks. Additionally, a clear varnish can be applied over the radiation curable ink for a further increase in the durability.

In some embodiments, material can be applied to the machined characters using a combination of application techniques described herein. For example, colored material (optionally together with an adhesive) such as colored ink can be applied to one or more of the machined characters using the foil 50, while a radiation curable material, such as radiation curable varnish, can be applied over the colored material using one of the drop-on-demand print heads 102*a-f*

FIG. 9 is a schematic depiction of a plastic card processing system 110 that includes the first mechanism 50, the second mechanism 52 and the curing mechanism 54. In this example, the mechanisms 50, 52, 54 are illustrated as being in-line and in sequential order with one another so that the mechanisms 50, 52, 54 effectively form a single combined mechanism. However, the mechanisms 50, 52, 54 can be spaced apart from one another with or without one or more additional mechanisms disposed between the mechanisms 50, 52, 54. In this example, the system 110 can be configured to perform only the formation of the machined characters, the application of the radiation curable material to the machined characters, and the curing of the radiation curable material on the card.

FIG. 10 is a schematic depiction of another embodiment of a plastic card processing system 120 that includes the first mechanism 52, the second mechanism 52 and the curing mechanism 54. In this example, the mechanisms 50, 52, 54 are illustrated as being in-line and in sequential order with one another. Each mechanism 50, 52, 54 is a separate module or mechanism from the other, facilitating replacement and/or maintenance on the mechanisms 50, 52, 54 and/or inclusion of other mechanisms between the mechanisms 50, 52, 54.

The system 120 can also include additional card processing mechanisms in addition to the mechanisms 50, 52, 54 to perform additional processing on the card. For example, the system 120 can include a card input 122 (also referred to as a card input hopper) which can be located, for example upstream of the first mechanism 50, to feed cards one by one into the system 120. The card input 122 is configured to hold a plurality of plastic cards to be processed as described herein. One or more additional card processing mechanisms 124 can be provided between the card input 122 and the first mechanism 50. The card processing mechanism(s) 124 can be one or more of an integrated circuit chip programming mechanism, a magnetic stripe read/write mechanism, a printing mechanism for performing printing on the cards, and other card processing mechanisms know in the art. Similarly, one or more additional card processing mechanisms 126 can be provided downstream of the curing mechanism 54. The card processing mechanism(s) 126 can be one or more of an integrated circuit chip programming mechanism, a magnetic stripe read/write mechanism, a printing mechanism for performing printing on the cards, a quality assurance mechanism for checking the quality of the processing on the cards, and other card processing mechanisms know in the art. A card output 128 (also referred to as a card output hopper) can be located downstream from the curing mechanism 54 at the end of the system 120. The card output 128 is configured to hold a plurality of the plastic cards after being processed.

The card is transported in the systems described herein using one or more suitable mechanical card transport mechanisms (not shown). Mechanical card transport mechanism(s) for transporting cards in card processing equipment of the type described herein are well known in the art. Examples of mechanical card transport mechanisms that could be used are known in the art and include, but are not limited to, transport rollers, transport belts (with tabs and/or without tabs), vacuum transport mechanisms, transport carriages, and the like and combinations thereof. Card transport mechanisms are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of card transport mechanisms that could be used, as well as the construction and operation of such card transport mechanisms.

The following additional implementations of the invention are also possible.

A plastic card personalization system can include a first mechanism that is configured to form non-printed machined characters on a plastic card by deforming a substrate material of the plastic card, a second mechanism that is positioned relative to the first mechanism to receive the plastic card with the non-printed machined characters, where the second mechanism is configured to apply radiation curable material to the non-printed machined characters, and a curing mechanism is positioned relative to the second mechanism to receive the plastic card with the radiation curable material applied to the non-printed machined characters, where the curing mechanism is configured to generate and apply radiation to the non-printed machined characters to cure the radiation curable material. The second mechanism can be configured to apply an ink to the indented characters. In addition, a card input can be provided that is configured to hold a plurality of the plastic cards and feed the plastic card for processing by the first mechanism, as well as include a card output that is configured to hold the plastic card after the radiation curable material is cured in the curing mechanism. The second mechanism can include one or a plurality of drop-on-demand print heads. The radiation curable material can be applied from a plurality of drop-on-demand print heads.

A method of personalizing a plastic card can include forming non-printed machined characters on the plastic card in a first mechanism by deforming a substrate material of the plastic card. Thereafter, the plastic card can be transported to a second mechanism and radiation curable material is applied to the non-printed machined characters in the second mechanism. Thereafter the plastic card can be transported to a curing mechanism and the radiation curable material that is applied to the non-printed machined characters is cured in the curing mechanism. The second mechanism may be used to apply an ink to the indented characters. In addition, prior to forming the non-printed machined characters on the plastic card, the plastic card can be fed from a card input that is configured to hold a plurality of the plastic cards, and after curing the radiation curable material the plastic card can be output into a card output that is configured to hold the plastic card.

In addition, a plastic card personalization system can include an embossing mechanism configured to form embossed characters on a plastic card; an application mechanism positioned to receive the plastic card after the plastic card is embossed in the embossing mechanism, where the application mechanism is configured to apply radiation curable material to tips of the embossed characters, and a curing mechanism that is positioned to receive the plastic card after the application mechanism applies the radiation curable material, where the curing mechanism is configured to generate and apply radiation to the embossed characters to cure the radiation curable material. The application mechanism may be configured to apply the radiation curable material and an ink to the tips of the embossed characters. In addition, the application mechanism may be configured to apply the radiation curable material using a topping foil or using drop-on-demand printing. In addition, the system ca include a card input that is configured to hold a plurality of the plastic cards, and a card output that is configured to hold the plastic card after the radiation curable material is cured. In addition, the application mechanism can include a topping foil that includes a carrier layer, a layer of the radiation curable material, and a layer of ink, wherein the layer of the radiation curable material is disposed between the carrier layer and the layer of ink. In addition, the topping foil can further include a layer of adhesive, wherein the layer of the radiation curable material and the layer of ink are disposed between the carrier layer and the layer of adhesive. In addition, the application mechanism can include at least one drop-on-demand print head that applies the radiation curable material. In addition, the application mechanism can include a plurality of drop-on-demand print heads that apply the radiation curable material.

In another implementation, a plastic card personalization system can include an indenting mechanism configured to form indented characters on a plastic card, an application mechanism positioned to receive the plastic card after the indented characters are formed in the indenting mechanism, wherein the application mechanism is configured to apply radiation curable material to the indented characters, and a curing mechanism positioned to receive the plastic card after the application mechanism applies the radiation curable material, where the curing mechanism is configured to generate and apply radiation to the indented characters to cure the radiation curable material. The application mechanism may be configured to apply the radiation curable material and an ink to the indented characters. In addition, the application mechanism may be configured to apply the radiation curable material using a topping foil or using drop-on-demand printing. In addition, the system can include a card input that is configured to hold a plurality of the plastic cards, and a card output that is configured to hold the plastic card after the radiation curable material is cured. In addition, the application mechanism can include a topping foil that includes a carrier layer, a layer of the radiation curable material, and a layer of ink, wherein the layer of the radiation curable material is disposed between the carrier layer and the layer of ink. In addition, the topping foil can further include a layer of adhesive, wherein the layer of the radiation curable material and the layer of ink are disposed between the carrier layer and the layer of adhesive. In addition, the application mechanism can include at least one drop-on-demand print head that applies the radiation curable material. In addition, the application mechanism can include a plurality of drop-on-demand print heads that apply the radiation curable material.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A plastic card personalization system, comprising:

a first mechanism that is configured to form non-printed machined characters on a plastic card by deforming a substrate material of the plastic card;

a second mechanism that is positioned relative to the first mechanism to receive the plastic card with the non-printed machined characters, the second mechanism is configured to apply radiation curable material to the non-printed machined characters;

a curing mechanism that is positioned relative to the second mechanism to receive the plastic card with the radiation curable material applied to the non-printed machined characters, the curing mechanism is configured to generate and apply radiation to the non-printed machined characters to cure the radiation curable material.

2. The plastic card personalization system of claim 1, wherein the first mechanism comprises:

a) an embossing mechanism and the non-printed machined characters comprise embossed characters, and the second mechanism is configured to apply the radiation curable material to tips of the embossed characters; or b) an indenting mechanism and the non-printed machined characters comprise indented characters, and the second mechanism is configured to apply the radiation curable material to the indented characters.

3. The plastic card personalization system of claim 2, wherein the radiation curable material comprises ultraviolet (UV) curable material, and the curing mechanism is configured to generate and apply UV radiation to the UV curable material.

4. The plastic card personalization system of claim 3, wherein the second mechanism is configured to apply the UV curable material using a foil or using drop-on-demand printing.

5. The plastic card personalization system of claim 2, wherein the second mechanism is configured to apply an ink to the tips of the embossed characters or apply an ink to the indented characters.

6. The plastic card personalization system of claim 1, wherein the second mechanism includes at least one drop-on-demand print head.

7. The plastic card personalization system of claim 1, wherein the second mechanism includes a foil that includes a carrier layer, a layer of the radiation curable material, and a layer of ink, wherein the layer of the radiation curable material is disposed between the carrier layer and the layer of ink.

8. A method of personalizing a plastic card, comprising:

forming non-printed machined characters on the plastic card in a first mechanism by deforming a substrate material of the plastic card;

thereafter transporting the plastic card to a second mechanism and applying radiation curable material to the non-printed machined characters in the second mechanism; and thereafter transporting the plastic card to a curing mechanism and curing the radiation curable material that is applied to the non-printed machined characters in the curing mechanism.

9. The method of claim 8, wherein the first mechanism comprises:

a) an embossing mechanism and the non-printed machined characters comprise embossed characters, and using the second mechanism to apply the radiation curable material to tips of the embossed characters; or b) an indenting mechanism and the non-printed machined characters comprise indented characters, and using the second mechanism to apply the radiation curable material to the indented characters.

10. The method of claim 9, wherein the radiation curable material comprises ultraviolet (UV) curable material, and using the curing mechanism to apply UV radiation to the UV curable material.

11. The method of claim 10, using the second mechanism to apply the UV curable material using a foil or using drop-on-demand printing.

12. The method of claim 9, comprising using the second mechanism to apply an ink to the tips of the embossed characters or apply an ink to the indented characters.

13. The method of claim 8, wherein applying the radiation curable material comprises applying the radiation curable material from at least one drop-on-demand print head.

14. The method of claim 8, wherein applying the radiation curable material comprises applying the radiation curable material from a foil that includes a carrier layer, a layer of the radiation curable material, and a layer of ink, wherein the layer of the radiation curable material is disposed between the carrier layer and the layer of ink.

15. A plastic card formed using the method of claim 8.

16. A plastic card, comprising:

a plastic card body;

a plurality of embossed characters formed on the plastic card body, each embossed character having a tip;

a colored material and a radiation-cured material on the tip of each one of the embossed characters.

17. The plastic card of claim 16, wherein the plastic card body further includes an integrated circuit chip and/or a magnetic stripe.

18. The plastic card of claim 16, wherein the plurality of embossed characters form some or all of a personal account number or a cardholder name.

19. The plastic card of claim 16, wherein the colored material comprises colored ink or a colored metal.

* * * * *